US 8,582,915 B2

(12) United States Patent
Wen et al.

(10) Patent No.: US 8,582,915 B2
(45) Date of Patent: Nov. 12, 2013

(54) IMAGE ENHANCEMENT FOR CHALLENGING LIGHTING CONDITIONS

(75) Inventors: Jiangtao Wen, La Jolla, CA (US); Xuan Dong, Beijing (CN); Yi Pang, Beijing (CN)

(73) Assignee: Wuxi Jinnang Technology Development Ltd., Jiangsu P.R. (CN)

( * ) Notice: Subject to any disclaimer, the term of this patent is extended or adjusted under 35 U.S.C. 154(b) by 337 days.

(21) Appl. No.: 13/169,124

(22) Filed: Jun. 27, 2011

(65) Prior Publication Data

US 2012/0328205 A1 Dec. 27, 2012

(51) Int. Cl.
*G06K 9/40* (2006.01)

(52) U.S. Cl.
USPC .......................................... 382/274; 382/261

(58) Field of Classification Search
None
See application file for complete search history.

(56) References Cited

U.S. PATENT DOCUMENTS

| | | | | |
|---|---|---|---|---|
| 7,643,659 B2 * | 1/2010 | Cao et al. | | 382/118 |
| 7,986,856 B2 * | 7/2011 | Chiang | | 382/276 |
| 8,059,913 B2 * | 11/2011 | Kwon et al. | | 382/274 |
| 8,184,924 B2 * | 5/2012 | Tsuruoka | | 382/274 |
| 8,401,280 B2 * | 3/2013 | Lim et al. | | 382/154 |
| 2004/0120599 A1 * | 6/2004 | Henley | | 382/274 |
| 2008/0025635 A1 * | 1/2008 | Han et al. | | 382/274 |
| 2010/0067823 A1 * | 3/2010 | Kopf et al. | | 382/274 |

OTHER PUBLICATIONS

Tao, et al., "A Multi-sensor Image Fusion and Enhancement System for Assisting Drivers in Poor Lighting Conditions", IEEE Computer Society, Proceedings of the 34th Applied Imagery and Pattern Recognition Workshop (AIPR05), 2005.
Ngo et al., "A Visibility Improvement System for Low Vision Drivers by Nonlinear Enhancement of Fused Visibile and Infrared Video", IEEE Computer Society, Proceedings of the 2005 IEEE Computer Society Conference on Computer Vision and Pattern Recognition (CVPR'05), 2005.
Girod et al., "A Content-Dependent Fast DCT for Low Bit-Rate Video Coding", IEEE, 1998.
Malm et al., "Adaptive enhancement and noise reduction in very low light-level video", IEEE, 2007.
Raanan Fattal, "Single Image Dehazing", ACM Transactions on Graphics, 2008.
He et al., "Single Image Haze Removal Using Dark Channel Prior", IEEE, 2010.
Alexis M. Tourpais, "Enhanced Predictive Zonal Search for Single and Multiple Frame Motion Estimation", Visual Communications and Image Processing 2002, Proceedings of SPIE vol. 4671, 2002.
Zaccarin et al., "Fast Algorithms for Block Motion Estimation", IEEE, 1992.
Lim et al., "Autonomous Monitoring of Fire-Related Haze from Space", Proceedings of the International Conference, 2004.
Narasimhan et al., "Chromatic Framework for Vision in Bad Weather", IEEE, 2000.
Narasimhan et al., "Vision and the Atmosphere", International Journal of Computer Vision 48(3), pp. 233-254, 2002.

(Continued)

*Primary Examiner* — Sean Motsinger
(74) *Attorney, Agent, or Firm* — Dinsmore & Shohl LLP

(57) ABSTRACT

An image and video enhancement technique is described that allows a core enhancement algorithm to be applied to images captured in various challenging lighting conditions. The technique detects a lighting impairment and inverts the image if it is a low-light impairment. The inverted low-light image is similar to haze impairment images, allowing both haze images and low-light images to be enhanced using the same enhancement algorithm.

21 Claims, 11 Drawing Sheets

(56) References Cited

OTHER PUBLICATIONS

Chan et al., "New Adaptive Pixel Decimation for Block Motion Vector Estimation", IEEE, 1996.
Tsimhoni et al., "Pedestrian Detection With Near and Far Infrared Night Vision Enhancement", UMTRI-2004-38.
Dong et al., "Fast Efficient Algorithm for Enhancement of Low Lighting Video", International Conference on Digital Media, 2010.
Bennett et al., "Video Enhancement Using Per-Pixel Virtual Exposures", SIGGRAPH, 2005.
Robby T. Tan, "Visibility in Bad Weather from a Single Image", British Crown Copyright, 2008.

* cited by examiner

700

IMAGE ENHANCEMENT FOR CHALLENGING LIGHTING CONDITIONS

TECHNICAL FIELD

The current application relates to image enhancement and in particular to enhancing images and videos captured in challenging lighting conditions.

BACKGROUND

Mobile cameras such as those embedded in smart phones are increasingly widely deployed. Mobile cameras are expected to acquire, record and sometimes compress and transmit images and video in various challenging lighting and weather conditions. For example, the mobile cameras may capture images or videos in low-lighting conditions or hazy conditions, which make capturing a satisfactory image challenging.

The majority of portable cameras are not specifically designed to be all-purpose and weather-proof, rendering the images and video footage unusable, or unsatisfactory, under various lighting conditions. Image and video processing and enhancement including gamma correction, de-hazing and de-blurring are well-studied areas. Although many algorithms perform well for different specific lighting impairments, they often require tedious and sometimes manual input-dependent fine-tuning of algorithm parameters.

In addition, different specific types of impairments often require different specific algorithms. Take low lighting video enhancement as an example. Although far and near infrared based systems are widely used, especially for professional grade video surveillance applications, they are usually more expensive, harder to maintain, and have a relatively shorter life-span than conventional systems. They also introduce extra, and often times considerable power consumption, making their use with mobile cameras difficult. In many consumer applications such as image and video capture and communications on smart phones, it is usually not feasible to deploy infrared systems due to such cost and power consumption issues. Other algorithms for enhancing images captured in low-light conditions have combined noise reduction, contrast enhancement, tone-mapping, histogram stretching, equalization, and gamma correction techniques. These algorithms have made tremendous progress over the years and can produce satisfactory results. However, low-lighting enhancement algorithms can be computationally complex, making their use undesirable in mobile cameras.

SUMMARY

In accordance with the present disclosure there is provided a method of enhancing a digital image comprising receiving a digital image; determining a lighting impairment type of the digital image; processing the received digital image based on the determined lighting impairment to produce a pre-processed image that appears as a particular impairment type of an enhancement algorithm; and applying the enhancement algorithm for the particular impairment type to produce a processed image. The enhancement algorithm is applied to the pre-processed image when the lighting impairment type of the digital image does not match the particular impairment type of the enhancement algorithm; or the digital image when the lighting impairment type of the digital image matches the particular impairment type.

In accordance with the present disclosure there is further provided a device for enhancing a digital image comprising an impairment detection component to determine a lighting impairment type of images; an enhancement component to apply an enhancement algorithm to images of a particular lighting impairment type; a pre-processing component to process images based on the determined lighting impairment to produce pre-processed images that appear as the particular impairment type of the enhancement algorithm; and an enhancement control component to receive a digital image, determine an impairment type of the digital image using the impairment detection component, and apply the enhancement algorithm of the image enhancement component to produce a processed image. The enhancement algorithm is applied to a pre-processed image, produced by processing the received digital image processed by the pre-processing component, when the lighting impairment type of the digital image does not match the particular lighting impairment type of the enhancement; or the digital image when the lighting impairment type matches the particular impairment type of the enhancement.

In accordance with the present disclosure there is further provided a non-transitory computer readable medium comprising instructions for receiving a digital image; determining a lighting impairment type of the digital image; processing the received digital image based on the determined lighting impairment to produce a pre-processed image that appears as a particular impairment type of an enhancement algorithm; and applying the enhancement algorithm for the particular impairment type to produce a processed image. The enhancement algorithm is applied to the pre-processed image when the lighting impairment type of the digital image does not match the particular impairment type of the enhancement algorithm; or the digital image when the lighting impairment type of the digital image matches the particular impairment type.

BRIEF DESCRIPTION OF THE DRAWINGS

Embodiments are described herein with references to the appended drawings, in which.

DETAILED DESCRIPTION

A method for enhancing images or videos captured in various challenging lighting conditions is described herein.

As described further, the method involves detecting an lighting impairment of the captured image or video, preprocessing the image or video based on the detected impairment type and then applying a core enhancement to the preprocessed image. Post processing is then applied to the image or video enhanced using the core enhancement.

The results of a pixel-wise inversion of low lighting images or video appear similar to hazy video. Through experiments, it was found that the same also hold true for a significant percentage of high dynamic range images or video. As such, if a low-lighting image or video or a high dynamic range image or video is inverted, it can be enhanced using enhancement techniques traditionally applied to hazy images or videos.

As a result a core enhancement can be applied to various images or video captured in a wide range of lighting conditions. The inversion operation can be simply performed according to:

$$R^c(x)=255-I^c(x) \quad (1)$$

Where:
c is the color channel (RGB).
$I^c(x)$ is the intensity of the color channel c of pixel x of the image I.
$R^c(x)$ is the intensity of the color channel c of pixel x of the reversed image R.

It is noted that the above inversion equation assumes that each pixel in a color channel is represented by 8 bits and so the maximum value for the intensity is 255.

In a hazy image, the intensities of background pixels are always high in all color channels, but the intensities of the main objects are usually low in at least one channel. To test whether reversed low lighting images and video had the same property, 100 images and videos, each captured in hazy, low-lighting or high dynamic range conditions, were randomly selected using internet search engine 'Google'. The low-lighting and high dynamic range images and videos were inverted and visually compared to the hazy images and videos. Visually, the inverted videos appeared similar to the hazy images and videos.

Figure 11:
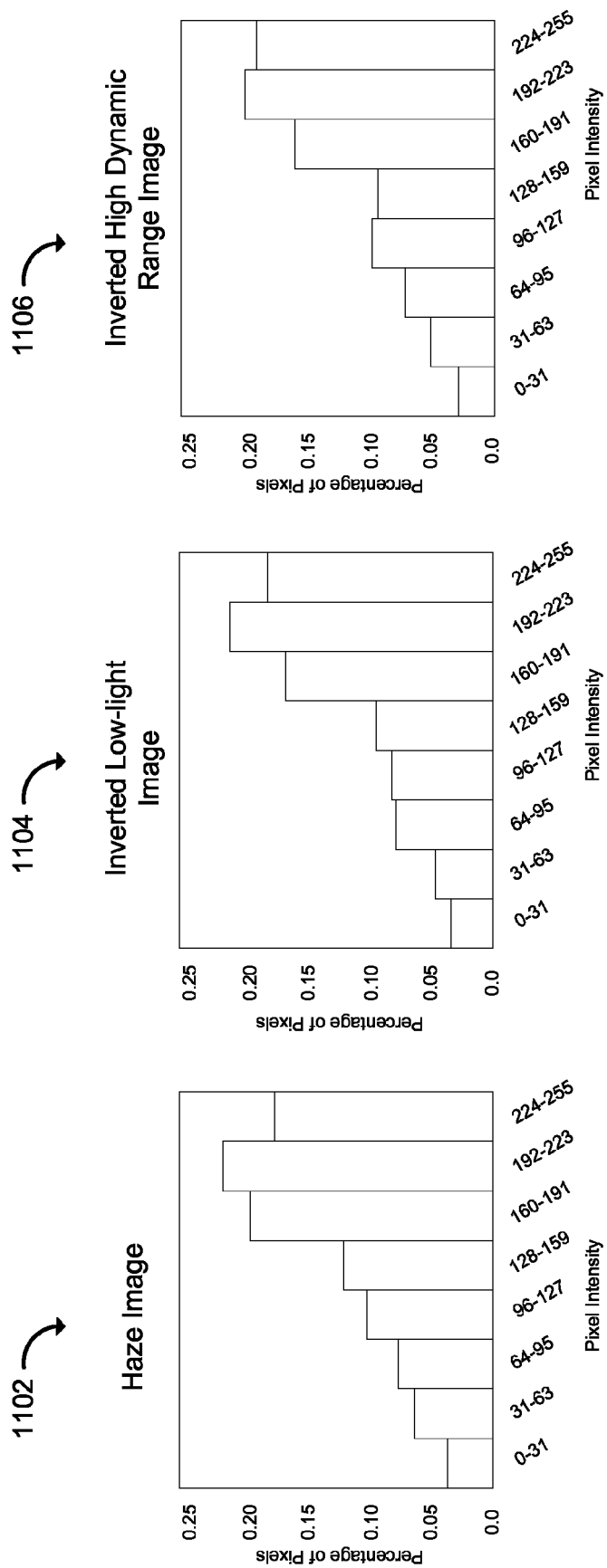
FIG. 11 depicts histograms of pixel intensities of different images.

Further, the minimum intensity of all color channels (RGB) for each pixel of the reversed images, as well as the hazy images were calculated. A chi-square test to examine the statistical similarities between hazy videos and inverted low lighting and high dynamic range videos. In chi-square tests, a p value is calculated, and usually, if p>0.05, it is reasonable to assume that the deviation of the observed data from the expectation is due to chance alone. In the test, the expected distribution was calculated from pixel intensities of the hazy videos and the observed statistics from inverted low lighting and high dynamic range videos were tested. In the experiments, the range [0, 255] of color channel intensities was divided into eight equal intervals, corresponding to a degree of freedom of 7. The histogram of the minimum intensities of all color channels of all pixels for hazy videos, inverted low lighting and inverted high dynamic range videos were used in the tests. Histograms from the different images are depicted in FIG. 11, which depicts the similarity between hazy images 1102, inverted low-light images 1104 and inverted high dynamic range images 1106. According to the chi-square distribution table, if the common standard of p>0.05 is adopted, the corresponding upper threshold for the chi-square value would be 14.07. The results of the chi-square tests are given in Table 1. As can be seen from the table, the chi-square values are far smaller than 14.07, demonstrating that similarities between haze videos and inverted low lighting videos, and between haze videos and inverted high dynamic range videos exist.

TABLE 1

Results of chi square tests

| Data of chi square test | Degrees of freedom | Chi square value |
| --- | --- | --- |
| Haze video and inverted low lighting video | 7 | 13.21 |
| Haze video and inverted high dynamic range video | 7 | 11.53 |

Finally, the observation was confirmed by applying various haze detection algorithms to inverted low-light images and inverted high dynamic range image. Haze detection was implemented using the HVS threshold range based method, the Dark Object Subtraction (DOS) approach, and the spatial frequency based technique. It was found that hazy, inverted low lighting videos and inverted high dynamic range videos were all classified as hazy video clips. 'Normal' clips, that is clips that were captured under good lighting conditions were not classified as hazy.

From the above, it is clear that haze images, low-light image and high dynamic range images can be enhanced using a single enhancement method used for enhancing haze images by preprocessing the low-light and high dynamic range images prior to applying the enhancement. The enhanced images of low-light and high dynamic range images are post-processed in order to invert the enhanced image.

Although the above has described high dynamic range images as being considered low-light images, it will be appreciated that a high-dynamic range image could also be considered a hazy image. For example, a high dynamic range image captured during the day having an overall high brightness may be considered a hazy image. It will be appreciated that reference to a hazy image or a low-light image may not refer to the conditions the image was captured in, but rather whether the image is determined to be a hazy image or a low light image.

Figure 1:
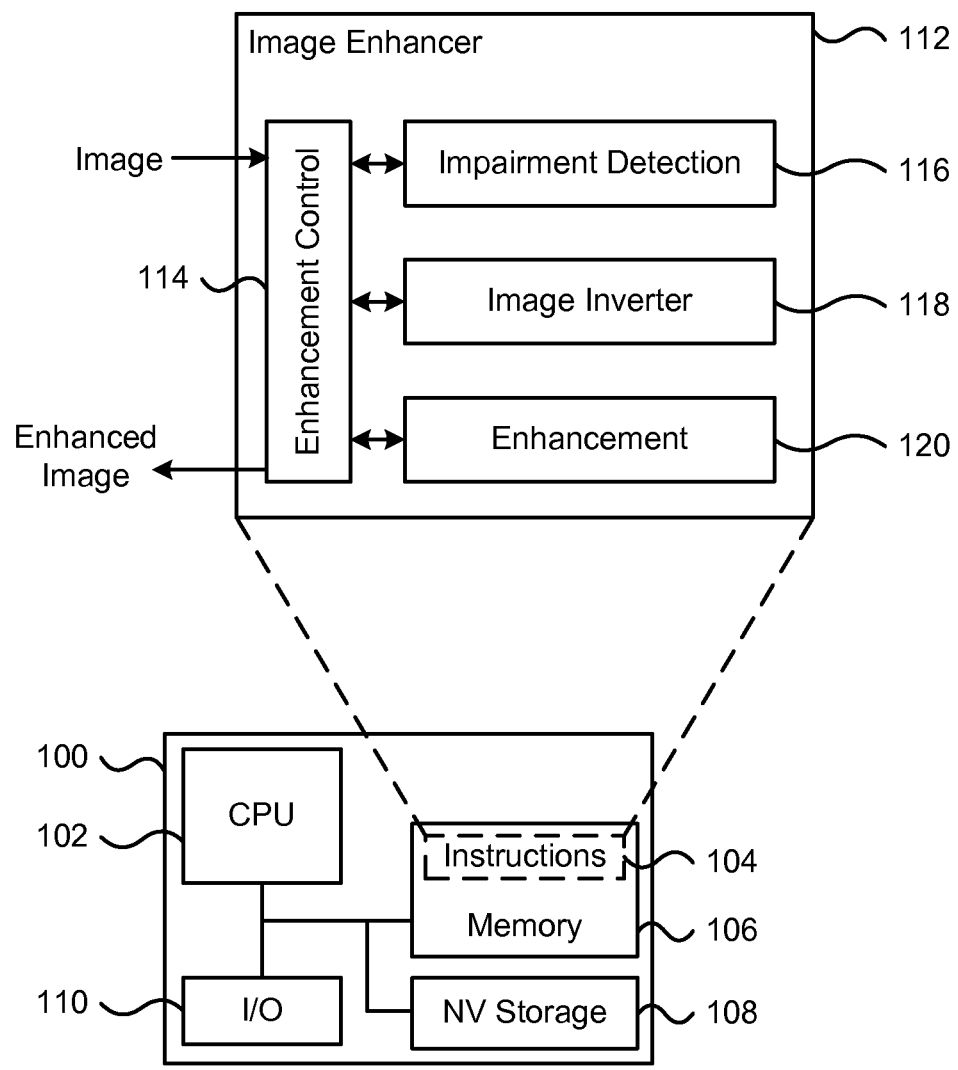
FIG. 1 depicts in a block diagram components of an image enhancing device.

FIG. 1 depicts in a block diagram components of an image enhancing device. The device 100 comprises a central processing unit (CPU) 102 that executes instructions 104 stored in a memory unit 106. The device 100 may also comprise non-volatile storage 108 as well as an input/output (I/O) 110 component. The device 100 may be a camera or device incorporating an image sensor such as a phone.

The instructions 104 when executed by the CPU 102 configure the device 100 to provide an image enhancing component 112. The image enhancing component 112 comprises an enhancement control component 114 that receives an image to be processed, controls the overall enhancement process of the image and returns an enhanced image. The image enhancing component 112 further comprises an impairment detection component 116 that can detect the type of lighting impairment of a video. The impairment detection component 116 can identify an image as a 'normal' image requiring no further enhancement, a haze image, or a low-light image, which may include high dynamic range images. The image enhancing component 112 further comprises an image inverting component 118 for inverting an image. The image enhancing component 112 further comprises an enhancement component 120 that enhances an image.

The enhancement control component 114 receives an image and uses the impairment detection component 116 to classify the image as either a normal image, a haze image or a low-light image. For normal images no further processing is required and the image is returned without any enhancement being applies. If the image is identified as a low light image, the image is provided to the image inverting component 118 to be inverted. The enhancement control 114 provides the inverted image for low light images or the original image for haze images to the enhancement component 120 for enhancement. Once the image is enhanced, the enhancement control component 114 returns the enhanced image if the original image was a haze image. If the original image was a low-light image, the enhanced image is provided to the image inverting component 118 for inversion again prior to returning the image.

Figure 2:
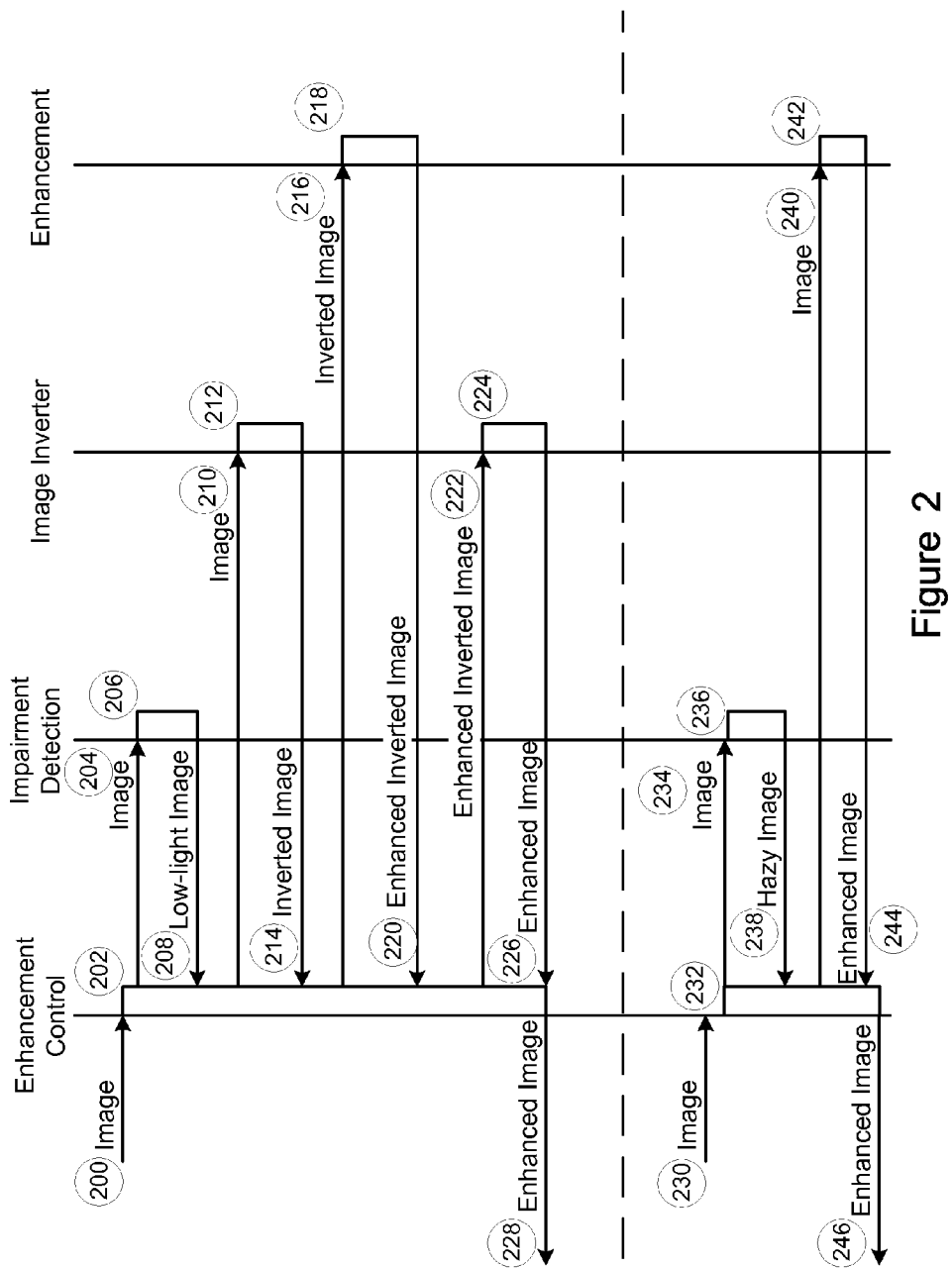
FIG. 2 depicts in a process flow diagram the processing of a low-light image and a hazy image.

FIG. 2 depicts in a process flow diagram the processing of a low-light image and a hazy image using an image enhancing component, such as image enhancing component 112. At 200 an image, which is assumed to be a low-light image, is received at the enhancement control which begins processing the image at 202. The enhancement control provides the image to the impairment detection component at 204. The impairment detection component detects the impairment type at 206 and provides an indication at 208 that it is a low light image. The enhancement control then provides the image to the image inverted at 210, which inverts the image at 212 and returns the inverted image to the enhancement control component at 214. As described above, the inverted low-light image is similar to a haze image and as such, enhancement techniques for haze images can be applied to the inverted low-light image. The enhancement control provides the inverted image to the enhancement component at 216. The enhancement component applies the enhancement to the inverted image at 218 and returns the enhanced inverted image to the enhancement control at 220. The enhancement control component provides the enhanced inverted image to the image inverting component at 222, which inverts the image at 224 and returns the enhanced image to the enhancement control at 226. The enhanced image is then returned at 228.

At 230 an image, which is assumed to be a haze image, is received at the enhancement control which begins processing the image at 232. The enhancement control provides the image to the impairment detection component at 234. The impairment detection component detects the impairment type at 236 and provides an indication at 238 that it is a haze image. The enhancement control provides the image to the enhancement component at 240. The enhancement component applies the enhancement to the image at 242 and returns the enhanced image to the enhancement control at 244, which returns the enhanced image at 246.

The image enhancing component 112 described above with regards to FIGS. 1 and 2 is only one possible implementation. It is contemplated that numerous other implementations, using more or less components than described above are possible.

Figure 3:
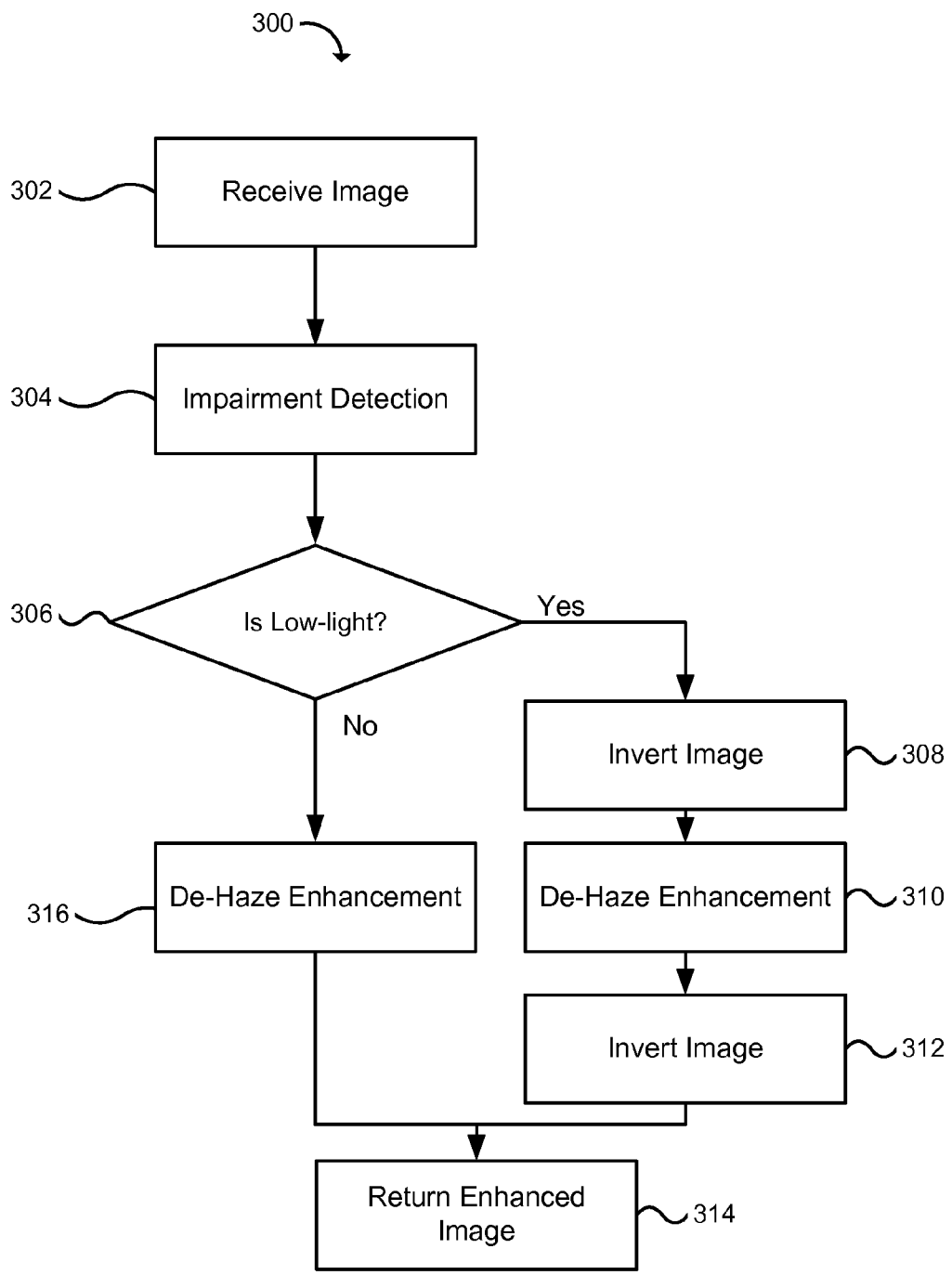
FIG. 3 depicts in a flow chart a method of enhancing an image captured in challenging lighting conditions.

FIG. 3 depicts in a flow chart a method of enhancing an image captured in challenging lighting conditions. In the following description, it is assumed that the core enhancement applied to images is a de-haze enhancement. The method 300 receives an image (302) that was captured in challenging lighting conditions and as such should have enhancements applied. It is noted that the image may also have been captured in good lighting conditions and as such would not require any enhancement, however such 'normal' images are not considered further for clarity of the description. The type of lighting impairment of the image is detected (304). It is determined if the impairment is a low-light impairment (306), and if it is (Yes at 306) the received image is inverted (308). Once the image is inverted a de-haze enhancement is applied (310) and then the enhanced image is again inverted (312). The enhanced image is then returned (314). If the lighting impairment is not a low-light impairment it is assumed to be a haze image, although as noted above it could be a normal image. When the image is not a low-light image (No at 306) the de-haze enhancement is applied to the received image (316) and the enhanced image is returned (314).

Figure 4:
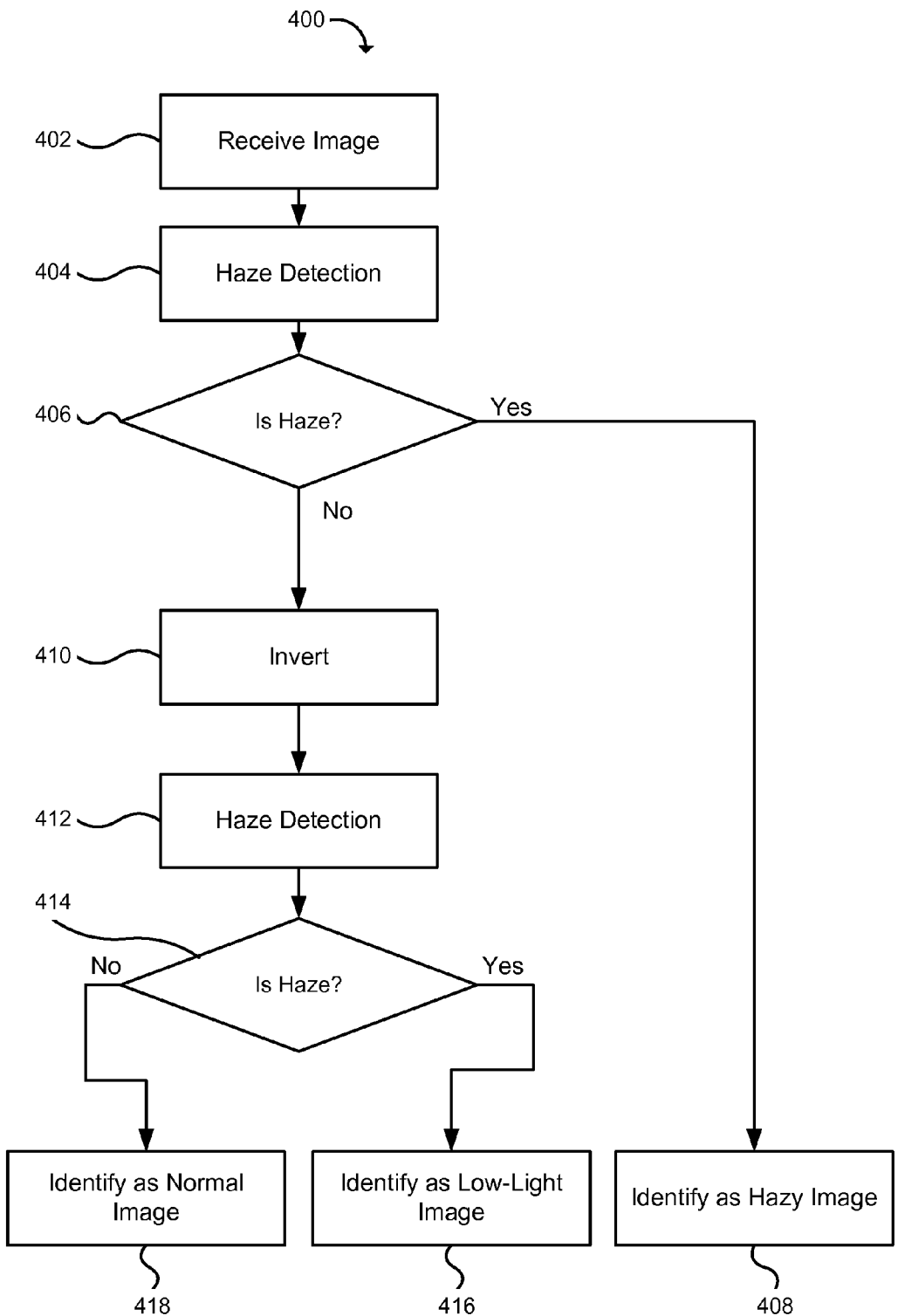
FIG. 4 depicts in a flow chart a method of detecting an impairment type in an image.

FIG. 4 depicts in a flow chart a method of detecting an impairment type in an image. The method 400 begins with receiving an image (402) and performing haze detection (404). The haze detection may be done using various known haze detection algorithms, which are not described further herein. The haze characterization may be determined for each pixel in an image, and for example if over 60% of the pixels are hazy the image may be identified as hazy. The results of the haze detection are checked to determine if the image is a haze image (406). If the haze detection indicates that the received image is a haze image (Yes at 406), the image is identified as a haze image (408) and the method 400 is completed. If the image is not a haze image (No at 406), the received image is inverted (410) and the haze detection is performed on the inverted image (412). The results of the haze detection are again checked (414). If the inverted image is a haze image (Yes at 414) it is identified as a low-light image (416). If the inverted image is not a haze image (No at 414) it is identified as a 'normal' image (418).

Once the image is identified as either a haze image or a low light image a de-hazing enhancement is applied to the haze image or the inverted low light image. Pixel degradation for hazy images can be modeled by:

$$R(x)=J(x)t(x)+A[1-t(x)] \qquad (2)$$

Where:
R(x) is the intensity of pixel x captured by the camera.
J(x) is the original intensity of pixel x, that is the intensity that would have been captured by the camera if it was not hazy.
t(x) is the medium transmission function describing the percentage of the light emitted from the objects that reaches the camera.
A is the global 'airlight' value which is indicative of ambient light reflected into the line of sight by atmospheric particles.

According to the above model, each degraded pixel is a mixture of the airlight and an unknown surface radiance, the intensities of both are influenced by the medium transmission. In order to determine J(x) values for both t(x) and A need to be determined.

The airlight value A can be estimated using various known techniques including the Dark Channel method. With an estimate for A, the medium transmission can be estimated according to:

$$t(x) = 1 - \omega \min_{c \in \{r,g,b\}} \left\{ \min_{y \in \Omega(x)} \frac{R^c(y)}{A^c} \right\} \qquad (3)$$

Where:
$\omega = 0.8$.
$\Omega(x)$ is a local 3×3 block centered at x.

Once A and t(x) are determined, the de-haze image may be determined from (2). The de-hazed image can be determined from:

$$J(x) = \frac{R(x) - A}{t(x)} + A \qquad (4)$$

Although (4) works reasonably well for haze removal, for inverted low-lighting enhancements, it was found that (4)

might lead to under-enhancement for low luminance areas and over-enhancement for high luminance areas. To solve this problem, (4) was modified to:

$$J(x) = \frac{R(x) - A}{P(x)t(x)} + A \quad (5)$$

Where:

$$P(x) = \begin{cases} Kt(x) & 0 < t(x) \leq 0.5 \\ -Kt^2(x) + M & 0.5 < t(x) \leq 1 \end{cases} \quad (6)$$

Where:
$K = 0.6$.
$M = 0.5$.

Both K and M may be determined experimentally. According to (5) and (6) when t(x) is smaller than 0.5, which means that the corresponding pixel needs boosting, P(x) is assigned a small value to make P(x)t(x) even smaller to increase the correspond J(x) and so the RGB intensities of the pixel. On the other hand, when t(x) is greater than 0.5, P(x) is set to avoid over boosting the corresponding pixel intensities. Alternatively, when t(x) is close to 1, P(x) may be provided such that P(x) t(x) may be larger than 1 resulting in a slight dulling of the pixel which provides a more balanced and visually pleasant visual quality.

Figure 5:
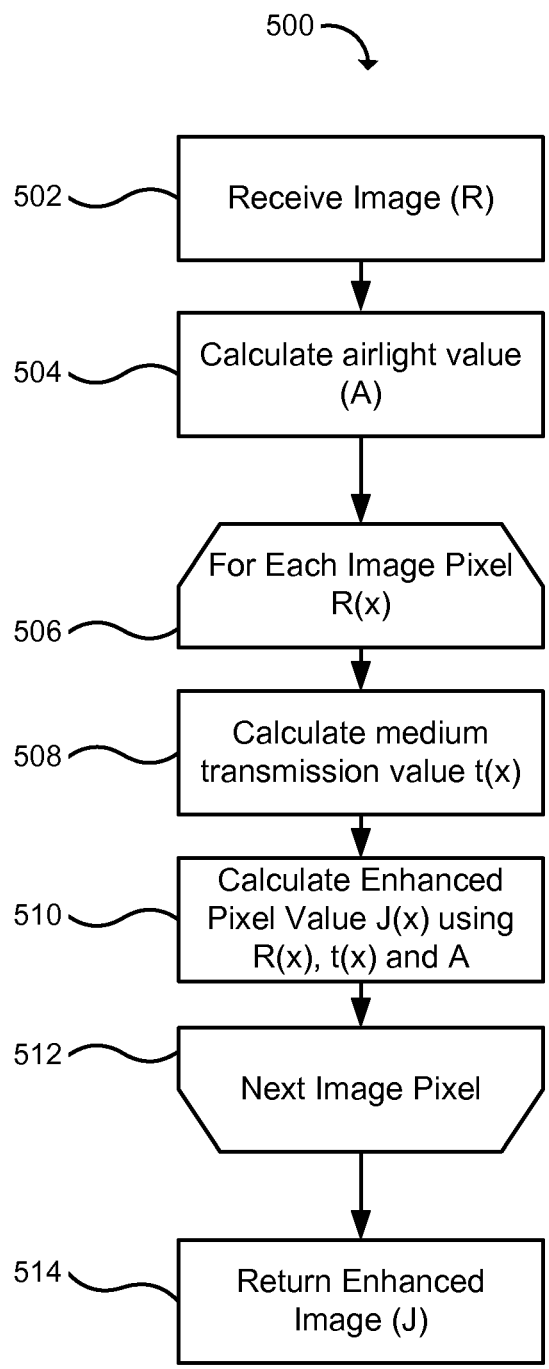
FIG. 5 depicts in a flow chart a method of de-haze enhancement.

FIG. 5 depicts in a flow chart a method of de-haze enhancement. The method 500 begins with receiving an image (R) (502). The received image R is processed to estimate the airlight value A (504). With the estimated airlight value A, each pixel x is processed to in the image R. For each pixel in the image R(x) (506), the medium transmission value (t(x)) is determined. t(x) may be determined according to equation (3) above. The value for the intensity of the enhanced pixel J(x) is determined (510) using the estimated values of A and t(x). The enhanced pixel intensity J(x) may be determined using either equation (4) or (5) above. The next pixel in the image is processed (512) until all of the pixels of the image have been processed. Once all of the enhanced pixel intensities have been determined the enhanced image J is returned.

The system and methods above described how to enhance images captured under various different lighting conditions using the same core enhancement technique. The above description was limited to processing a single image for clarity. As described further below, the system and methods can be adapted to process videos captured under various lighting conditions.

Figure 6:
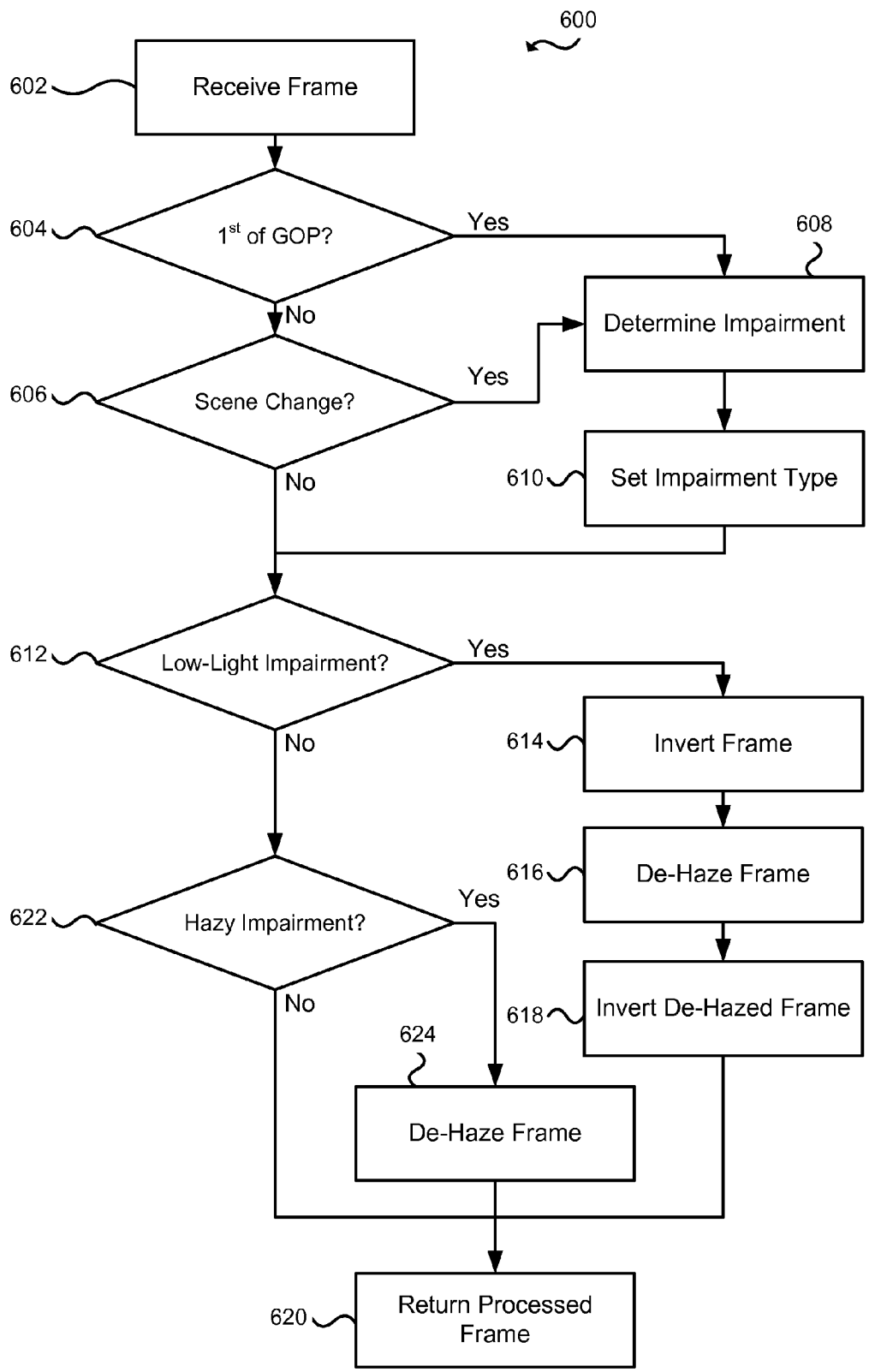
FIG. 6 depicts in a flow chart a method of enhancing frames of a video captured in challenging lighting conditions.

FIG. 6 depicts in a flow chart a method of enhancing frames of a video captured in challenging lighting conditions. Unlike processing a single image, in which the lighting impairment of each image is determined, the lighting impairment for videos is only determined for a Group of Pictures (GOP) or for a particular scene. The method 600 begins with receiving a frame of the video to be processed (602). The received frame is checked to determine if it is the first frame of a GOP (604). If it is not the first frame of a GOP (No at 604) it is checked to determine if there has been a scene change (606). If there has been a scene change (Yes at 606) or if the received frame is the first of a GOP (Yes at 604) the lighting impairment is determined from the received frame (608). The determined lighting impairment is set (610) for use by subsequently received frames.

After the impairment type has been set, or if the received frame is not a first frame of a GOP or a scene change, the impairment type is checked to see if it is a low light impairment (612). If the impairment type is set to a low-light impairment (Yes at 612) the frame is inverted (614) and then the inverted frame is de-hazed (616). The enhanced frame is inverted again (618) and the processed frame is returned (620). If the impairment type is not a low light impairment (No at 612) it is checked to determine if it is a hazy impairment (622). If it is a hazy impairment (Yes 622) the frame is de-hazed (624) and the processed frame returned (620). If the impairment is not a hazy impairment (No at 622), which means that it is a 'normal' frame that does not need to be enhanced, the processed frame, which has not been enhanced, is returned (620).

In addition to determining the impairment type once for a plurality of frames, that is the frames of a GOP or the frames of a scene, the estimation of the airlight value used in the de-hazing technique may also be modified. De-hazing techniques are often very sensitive to the airlight value. Even very small changes to the airlight value might lead to very large changes in the recovered images or video frames. As a result, calculating the airlight frame-by-frame for videos not only increases the overall complexity of the system, but may also introduce visual inconsistency between frames, thereby creating annoying visual artifacts. In order to provide a more consistent enhancement for videos, the airlight value may only be calculated for the first frame in a GOP or if a scene change is detected. A scene change may not be aligned with a GOP boundary, but may result in a large change in the characteristics of the frame, including the impairment type and the estimate of the airlight value. The same airlight value is then used for all subsequent frames in the same GOP or scene. Additionally, it may be desirable to avoid severe changes in the airlight value between successive GOPs. To avoid severe changes the global airlight value used by the de-hazing algorithm may be updated according to:

$$A = A*0.4 + A_f*0.6 \quad (7)$$

Where:
A is the global airlight value; and
$A_f$ is the airlight value calculated for the frame.

The method described above with regards to FIG. 6 for processing video is a frame based approach. That is, t(x) is calculated for each frame when de-hazing the frame. The calculation of t(x) may consume about 60% of the computation time. For real-time and low complexity processing of video inputs, calculating t(x) frame by frame not only has high computational complexity, but can also make the output results much more sensitive to temporal and spatial noise, as well as destroying the temporal and spatial consistency of the processed frames.

To remedy these problems, the calculation of t(x) can be expedited using motion estimation/compensation (ME/MC) techniques. The use of ME/MC techniques are possible in calculating t(x) since t(x) and other model parameters are correlated temporally and spatially.

ME/MC is a key procedure in all state-of-the-art video compression algorithms. By matching blocks in subsequently encoded frames to find the "best" match of a current block and a block of the same size that has already been encoded and then decoded (the "reference"), video compression algorithms use the reference as a prediction of the current block and encodes only the difference (termed the "residual") between the reference and the current block, thereby improving coding efficiency. The process of finding the best match between a current block and a block in a reference frame is called "motion estimation". If a "best" match block is found, the current block will be encoded in the inter mode and only the residual will be encoded. Otherwise, the current block will be encoded in the intra mode. The most common metric used in motion estimation is the Sum of Absolute Differences (SAD).

Figure 7:
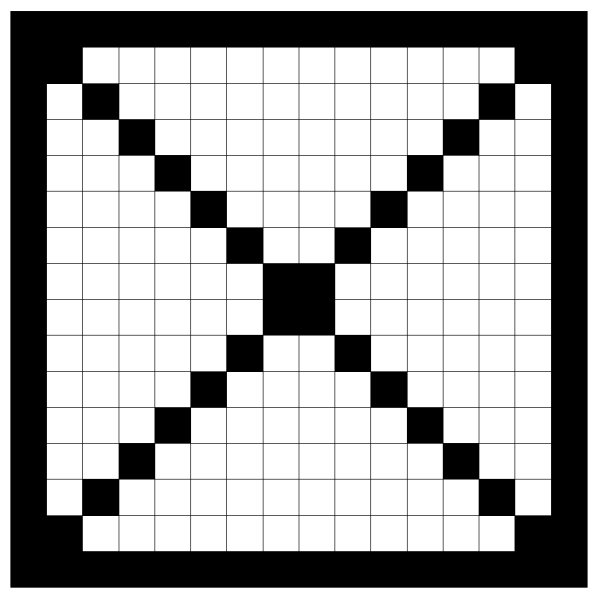
FIG. 7 depicts a pixel sampling pattern.

It is possible to utilize ME/MC to by-pass the calculation of t(x) for the majority of the pixels/frames, and only calculate the t(x) for a small number of selective frames. For the remainder of the frames, the corresponding t(x) values of the reference pixels can be used. For motion estimation, the mature fast motion estimation algorithms e.g. Enhanced Prediction Zonal Search (EPZS) may be used. When calculating the SAD, only a subset of the pixels in the current and reference blocks were utilized as depicted in pattern 700 shown in FIG. 7. With this pattern, the calculation used a total of 60 pixels in a 16×16 block, or roughly 25%. These pixels were located on either the diagonals or the edges, resulting in about 75% reduction in SAD calculation when implemented in software on a general purpose processor.

Figure 8:
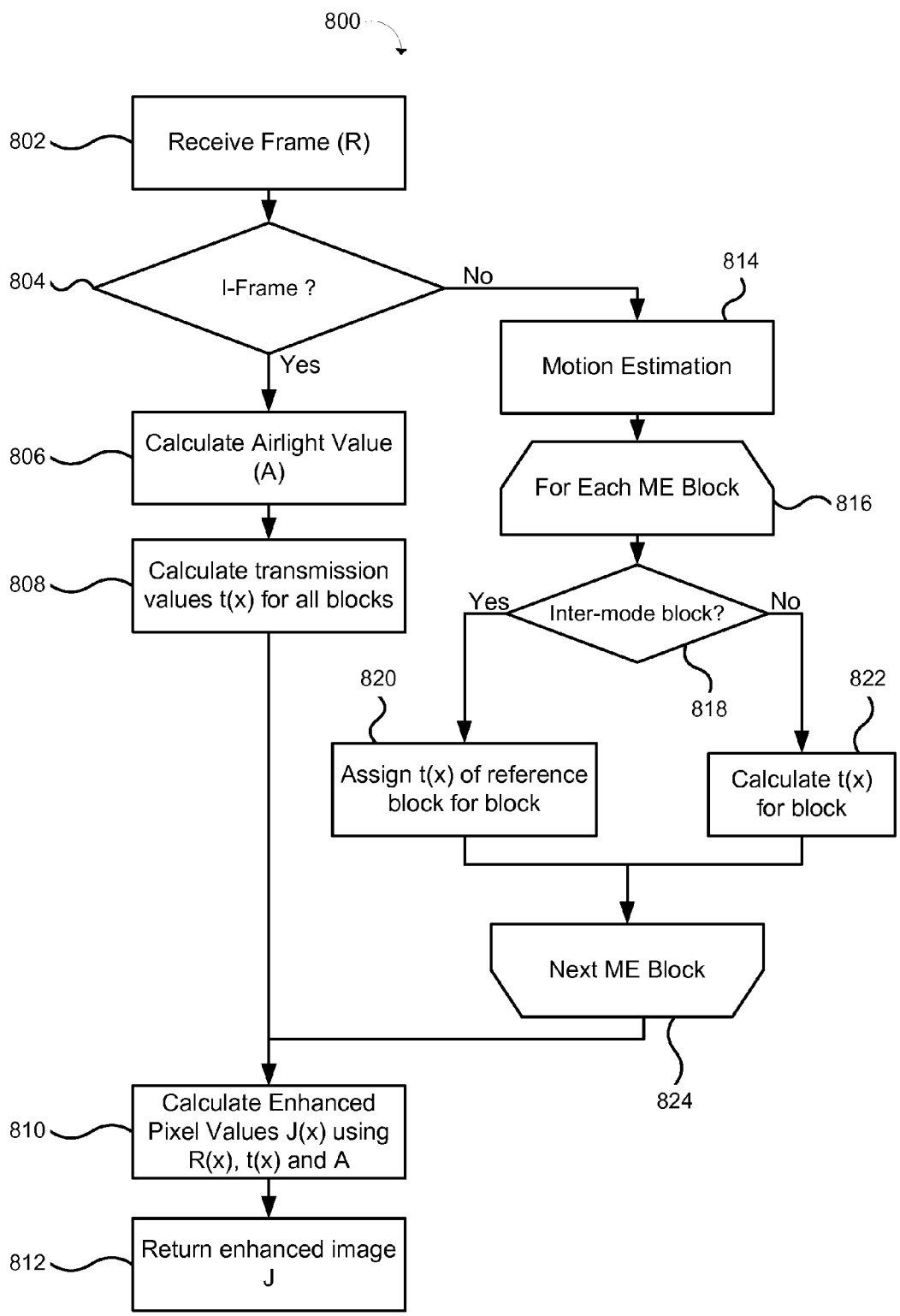
FIG. 8 depicts in a flow chart a method of de-haze enhancement for frames of a video.

FIG. 8 depicts in a flow chart a method of de-haze enhancement for frames of a video. The method 800 begins with receiving a frame (802) and determining if the frame is an Intra coded frame (I frame) (804). If it is an I frame (Yes at 804) the global airlight value A for subsequent frames is calculated (806) and t(x) is calculated for the entire frame (808). Once the airlight A and medium transmission t(x) values are determined the enhanced pixel values J(x) are determined using the received frame pixel values R(x), A and t(x) (810). Once determined, the enhanced image frame R(x) is returned (812). If the received frame is not an I frame (No at 804), it will be a P frame and motion estimation is performed on the frame (814), similar to conventional video encoding. To this end, each P frame is divided into non-overlapping 16×16 blocks, for which a motion search using the SAD is conducted. Each block (816, 824) is checked to determine if it is an inter-mode block (818). A threshold T is defined for the SAD of blocks. If the SAD is below the threshold T, which means a "best" match block is found, the block is considered an inter-mode block. If the block is an inter-mode block (Yes at 818) the t(x) value for the corresponding block in the reference frame is used as the block's t(x) (820) and as such the calculation of t(x) for the entire block is skipped. Otherwise, if the block is not an inter-mode block (No at 818) t(x) is calculated for the block (822). In both cases, the values for the current frame are stored for reference by the next frame. Once all of the t(x) values are determined, the enhanced pixel values are determined (810) and the enhanced image frame is returned (812).

Figure 9:
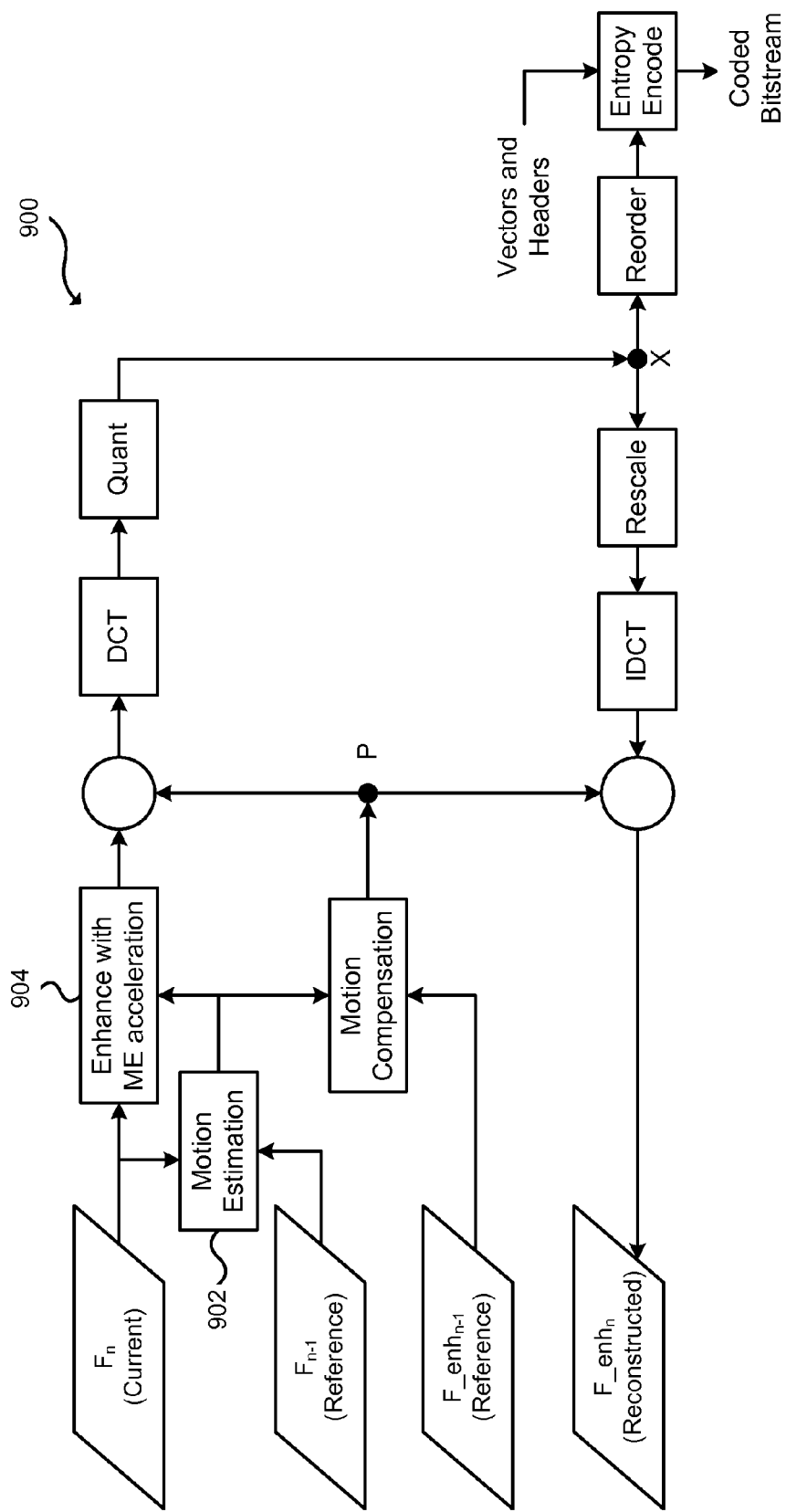
FIG. 9 depicts in a block diagram components of a video encoder incorporating image enhancement for challenging lighting conditions.
Figure 10:
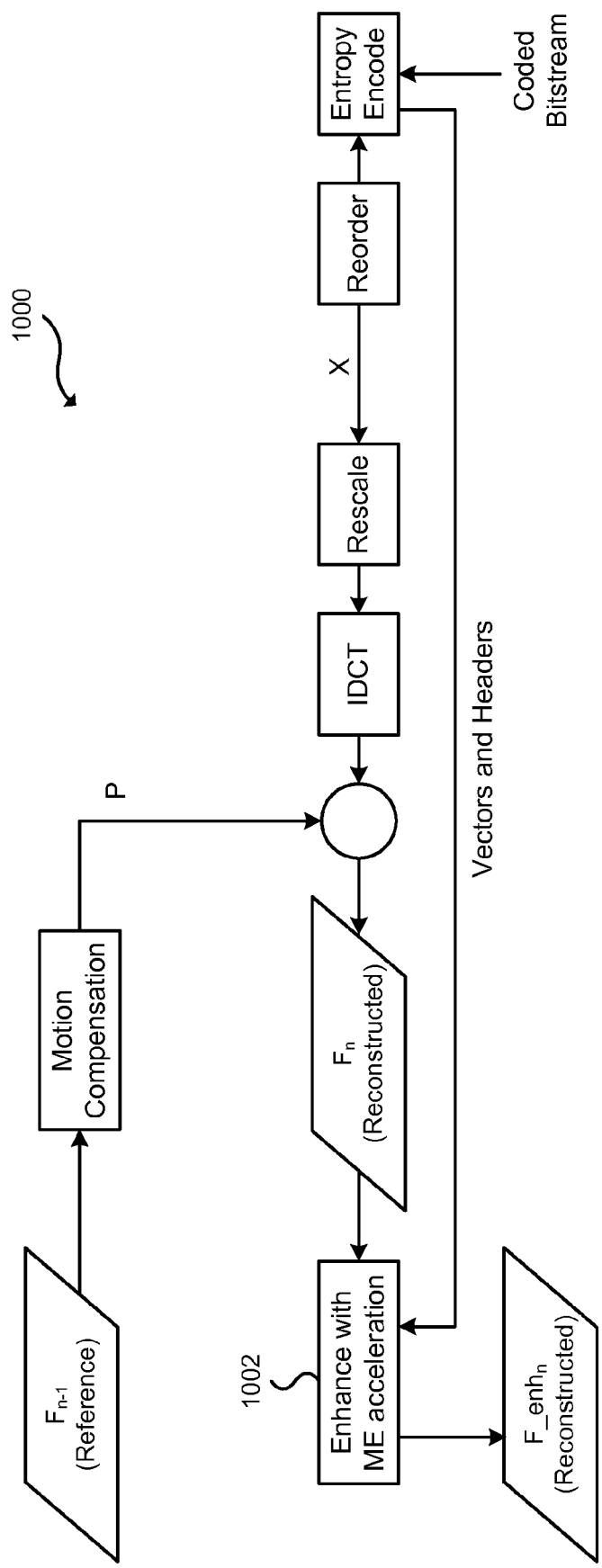
FIG. 10 depicts in a block diagram components of a video decoder incorporating image enhancement for challenging lighting conditions.

In addition to operating as a stand-along module with uncompressed pixel information as both the input and output, the ME accelerated enhancement algorithm could also be integrated into a video encoder or a video decoder. An encoder incorporating the enhancement algorithm is depicted in FIG. 9. A decoder incorporating the enhancement algorithm is depicted in FIG. 10. When the algorithm is integrated with a video encoder, the encoder and the enhancement component 902 can share the ME module 904 that provides the motion information necessary for accelerating the calculation of t(x). The components of component of the encoder are well known, and only those components related to the enhancement algorithm are discussed. As depicted in FIG. 9, when the encoder 900 receives a new frame ($F_{n(current)}$) motion estimation is performed and the information provided to the enhancement component 902 which enhances the frame prior to encoding.

When the enhancement is integrated with a decoder 1000, the system has the potential of using the motion information contained in the input video bit stream directly, and thereby by-passing the entire ME process. As depicted, the bit stream is decoded and the ME information contained in the vectors and headers encoded in the bit stream is passed to the enhancement component 1002 which utilizes the information to enhance the decoded frames.

Depending on the target application and the camera and processing platforms used, different systems could introduce different add-on modules on top of the base line enhancement system described above for further improvements in visual quality. For example, it is possible to focus the processing on moving objects that are more likely to be in the Regions of Interests (ROIs), and/or more visible to the human visual system. Moving objects and static background can be segments, and then depending on whether a pixel belongs to the background or a moving object, the parameters K and M used in the calculation of P(x) can be modified to $K_{moving}$ and $W_{moving}$ for moving objects, or $K_{background}$ and $M_{background}$ for the background respectively.

Addition, to avoid abrupt changes of luminance around the edges of moving objects, a band of $W_{trans}$-pixels wide around the moving objects can be defined as a transition area. For the transition areas, P(x) can be calculated using $K_{trans}$ and $M_{trans}$ which are calculated according to:

$$K_{trans} = \frac{d}{W_{trans}} K_{moving} + \frac{W_{trans} - d}{W_{trans}} K_{background} \tag{8}$$

$$M_{trans} = \frac{d}{W_{trans}} M_{moving} + \frac{W_{trans} - d}{W_{trans}} M_{background} \tag{9}$$

Where d is the distance between the pixel x and the edge of the moving object with which the transition area borders. $K_{moving}$ may be set to, for example 0.6. $M_{moving}$ may be set to, for example 0.5. $K_{background}$ may be set to, for example 0.8. $M_{background}$ may be set to, for example 1.2.

Further optimization to the enhancement algorithms described above may be made by taking advantage of the redundancies inherent to the pixel wise calculations of t(x) and $I^c(x)$. First of all, the calculation of t(x) according to equation (3) above may be incorporated into the calculation of J(x) according to equation (5) above, so that:

$$J(x) = \frac{I(x) - \omega A \min_{c \in \{r,g,b\}} \left\{ \min_{y \in \Omega(x)} \frac{I^c(y)}{A^c} \right\}}{1 - \omega \min_{c \in \{r,g,b\}} \left\{ \min_{y \in \Omega(x)} \frac{I^c(y)}{A^c} \right\}} \tag{10}$$

This allows for the enhancement of the input I(x) directly without calculating t(x). It should be noted that the aforementioned ME-based acceleration is still applicable to (10), however, rather than storing t(x) values for subsequent frames $$\frac{I^c(y)}{A^c}$$

is stored.

Further, although the above has been described with regards to the RGB color space, it can easily be adapted to work in other color spaces, such as YUV.

$$Y_{out}(x) = \frac{Y_{in}(x) - \omega A \min_{c \in \{y,u,v\}} \left\{ \min_{y \in \Omega(x)} \frac{I^c(y)}{A^c} \right\}}{1 - \omega \min_{c \in \{y,u,v\}} \left\{ \min_{y \in \Omega(x)} \frac{I^c(y)}{A^c} \right\}} \tag{11}$$

-continued $$U_{out}(x) = \frac{U_{in}(x) - 128}{1 - \omega \min_{c \in \{y,u,v\}} \left\{ \min_{y \in \Omega(x)} \frac{I^c(y)}{A^c} \right\}} + 128 \quad (12)$$

$$V_{out}(x) = \frac{V_{in}(x) - 128}{1 - \omega \min_{c \in \{y,u,v\}} \left\{ \min_{y \in \Omega(x)} \frac{I^c(y)}{A^c} \right\}} + 128 \quad (13)$$

Additionally, to further speed up the implementation, the inherent redundancies in the pixel-wise calculations of the minimization in equations (10)-(13) above can be exploited, which corresponds to a complexity of $k^2 \times W \times H$ comparisons for an input frame of resolution W×H, and a search window (for the minimization) of size k×k pixels. To expedite the process, first the smaller of every two horizontally neighboring pixels in the frame are found and stored using a sliding horizontal window of size 2. This process has a complexity of W×H comparisons. Then, by again using a horizontal sliding window of 2 over the values stored in the previous step, it is possible to find the minimum of every 4 horizontally neighboring pixels in the original input frame. This process is repeated in both the horizontal and vertical directions, until the minimum of all k×k neighborhoods of the input. It is easy to find that such a strategy has a complexity of roughly 2 log$_2$ k×W×H comparisons, as opposed to $k^2$ ×W×H for the simplistic implementation.

The systems and methods described above provide the ability to enhance images or videos captured under various challenging lighting conditions using a single core enhancement algorithm. The systems and methods have been described using various embodiments in which the core enhancement algorithm is designed to enhance a haze image, and as such low-light images are inverted to appear as a haze image before applying the core enhancement algorithm. It is also contemplated that other core enhancement algorithms can be used. For example, a core enhancement algorithm may be designed for low-light images. In such a case, rather than inverting low-light images, the haze images are inverted to appear as a low-light image. Accordingly, images are inverted to appear as the type of image the core enhancement is designed to be applied to.

Furthermore, the type of lighting impairments have been described as a haze impairment or a low-light impairment. It is contemplated that the haze type impairment can include images captured under other conditions than haze, such as fog, rain, snow, etc. Similarly, the low-light impairment type may comprise images that were captured in low-light or high dynamic range images.

The above has described inverting an image having one impairment, for example low-light, to appear like an image having another impairment type, for example hazy, that an enhancement algorithm is designed for processing. It will be appreciated that types of pre-processing, other than inverting, the images based on the detected impairment type in order to change the image into an impairment type of the enhancement algorithm are possible. That is, an image can be pre-processed to convert the image into an pre-processed image having an impairment type that matches the particular impairment type the core enhancement algorithm is designed to work with.

The system and methods described herein have been described with reference to various examples. It will be appreciated that components from the various examples may be combined together, or components of the examples removed or modified. As described the system may be implemented in one or more hardware components including a processing unit and a memory unit that are configured to provide the functionality as described herein. Furthermore, a computer readable memory, such as for example electronic memory devices, magnetic memory devices and/or optical memory devices, may store computer readable instructions for configuring one or more hardware components to provide the functionality described herein.

What is claimed is:

1. A method of enhancing a digital image comprising:
    receiving a digital image;
    determining a lighting impairment type of the digital image;
    processing the received digital image based on the determined lighting impairment to produce a pre-processed image that appears as a particular impairment type of an enhancement algorithm; and
    applying the enhancement algorithm for the particular impairment type to produce a processed image, the enhancement algorithm applied to:
        the pre-processed image when the lighting impairment type of the digital image does not match the particular impairment type of the enhancement algorithm; or
        the digital image when the lighting impairment type of the digital image matches the particular impairment type.

2. The method of claim 1, further comprising applying an inverse of the processing applied to produce the pre-processed image to the processed image when the lighting impairment type of the digital image does not match the particular impairment type of the enhancement algorithm.

3. The method of claim 1, wherein the particular lighting impairment type of the enhancement algorithm is a haze type impairment, wherein the processing of the digital image comprises inverting the digital image, and wherein the enhancement algorithm is applied to the pre-processed image when the lighting impairment type of the digital image is a low-light type impairment.

4. The method of claim 1, wherein the particular lighting impairment type of the enhancement algorithm is a low-light type impairment, wherein the processing of the digital image comprises inverting the digital image, and wherein the enhancement algorithm is applied to the pre-processed image when the lighting impairment type of the digital image is a haze type impairment.

5. The method of claim 1, wherein the received digital image is a frame of a video.

6. The method of claim 5, wherein determining the lighting impairment type is performed if the received digital image is a first frame in a Group of Pictures (GOP) or a scene change is detected in the received digital image, the method further comprising:
    receiving subsequent digital images; and
    using the lighting impairment type determined for the first frame for the subsequent digital images.

7. The method of claim 5, wherein the particular impairment type of the enhancement algorithm is a haze type impairment, wherein the processed image is determined according to one of:

$$J(x) = \frac{R(x) - A}{t(x)} + A; \text{ or}$$

$$J(x) = \frac{R(x) - A}{P(x)t(x)} + A,$$

where:
J(x) is a pixel of the processed image;
R(x) is a pixel of the image being enhanced;
A is an estimate of an airlight value;
t(x) is an estimate of a medium transmission; and $$P(x) = \begin{cases} Kt(x) & 0 < t(x) \leq 0.5 \\ -Kt^2(x) + M & 0.5 < t(x) \leq 1 \end{cases}.$$

8. The method of claim 7, wherein the value of A is updated based on an airlight estimate of a current frame according to:

$$A = A*0.4 + A_t*0.6,$$

where:
$A_t$ is the airlight estimate of the current frame.

9. The method of claim 7, further comprising:
segmenting the subsequent digital images into blocks;
using motion estimation to estimate motion of blocks across subsequent digital images;
determining t(x) values for each of the blocks in a first image of the digital images; and
using the motion estimation of the blocks of subsequent digital images to apply the previously determined t(x) values as the t(x) values for the blocks.

10. A device for enhancing a digital image comprising:
an impairment detection component to determine a lighting impairment type of images;
an enhancement component to apply an enhancement algorithm to images of a particular lighting impairment type;
a pre-processing component to process images based on the determined lighting impairment to produce pre-processed images that appear as the particular impairment type of the enhancement algorithm; and
an enhancement control component to receive a digital image, determine an impairment type of the digital image using the impairment detection component, and apply the enhancement algorithm of the image enhancement component to produce a processed image, the enhancement algorithm applied to:
  a pre-processed image, produced by processing the received digital image processed by the pre-processing component, when the lighting impairment type of the digital image does not match the particular lighting impairment type of the enhancement; or
  the digital image when the lighting impairment type matches the particular impairment type of the enhancement.

11. The device of claim 10, wherein the enhancement control component applies an inverse of the processing applied to produce the pre-processed image to the processed image when the lighting impairment type of the digital image does not match the particular impairment type of the enhancement algorithm.

12. The device of claim 10, wherein the particular lighting impairment type of the enhancement algorithm is a haze type impairment, wherein the processing of the digital image comprises inverting the digital image, and wherein the enhancement algorithm is applied to the inverted image when the lighting impairment type of the digital image is a low-light type impairment.

13. The device of claim 10, wherein the particular lighting impairment type of the enhancement algorithm is a low-light type impairment, wherein the processing of the digital image comprises inverting the digital image, and wherein the enhancement algorithm is applied to the inverted image when the lighting impairment type of the digital image is a haze type impairment.

14. The device of claim 10, wherein the received digital image is a frame of a video.

15. The device of claim 14, wherein determining the lighting impairment type is performed if the received digital image is a first frame in a Group of Pictures (GOP) or a scene change is detected in the received digital image, the device further for:
receiving subsequent digital images; and
using the lighting impairment type determined for the first frame for the subsequent digital images.

16. The device of claim 14, wherein the particular impairment type of the enhancement algorithm is a haze type impairment, wherein the processed image is determined according to one of:

$$J(x) = \frac{R(x) - A}{t(x)} + A; \text{ or}$$

$$J(x) = \frac{R(x) - A}{P(x)t(x)} + A,$$

where:
J(x) is a pixel of the processed image;
R(x) is a pixel of the image being enhanced;
A is an estimate of an airlight value;
t(x) is an estimate of a medium transmission; and $$P(x) = \begin{cases} Kt(x) & 0 < t(x) \leq 0.5 \\ -Kt^2(x) + M & 0.5 < t(x) \leq 1 \end{cases}.$$

17. The device of claim 16, wherein the value of A is updated based on an airlight estimate of a current frame according to:

$$A = A*0.4 + A_t*0.6,$$

where:
$A_t$ is the airlight estimate of the current frame.

18. The device of claim 16, wherein t(x) is determined using motion estimation and previously determined values of t(x).

19. The device of claim 18, further comprising components for encoding the video, wherein motion estimation performed for encoding the video is used in determining t(x)

20. The device of claim 18, further comprising components for decoding the video, wherein the motion estimation used to determine the t(x) is contained in vectors and headers of the video.

21. A non-transitory computer readable medium comprising instructions for:
receiving a digital image;
determining a lighting impairment type of the digital image;
processing the received digital image based on the determined lighting impairment to produce a pre-processed image that appears as a particular impairment type of an enhancement algorithm; and
applying the enhancement algorithm for the particular impairment type to produce a processed image, the enhancement algorithm applied to:

the pre-processed image when the lighting impairment type of the digital image does not match the particular impairment type of the enhancement algorithm; or the digital image when the lighting impairment type of the digital image matches the particular impairment type.

* * * * *